(12) United States Patent
Mate

(10) Patent No.: US 6,859,845 B2
(45) Date of Patent: Feb. 22, 2005

(54) SYSTEM FOR RESOLVING CONFLICTS DUE TO SIMULTANEOUS MEDIA STREAMS AND METHOD THEREOF

(75) Inventor: Elena Mate, Toronto (CA)

(73) Assignee: ATI Technologies, Inc., Thornhill (CA)

( * ) Notice: Subject to any disclaimer, the term of this patent is extended or adjusted under 35 U.S.C. 154(b) by 283 days.

(21) Appl. No.: 09/847,705

(22) Filed: May 2, 2001

(65) Prior Publication Data

US 2002/0164155 A1 Nov. 7, 2002

(51) Int. Cl.[7] .............................................. G06F 13/00
(52) U.S. Cl. ....................... 710/5; 710/6; 710/7; 710/8; 710/20; 710/27; 710/36; 710/38; 710/40; 710/260
(58) Field of Search ............................. 710/6, 7, 8, 20, 710/27, 36, 38, 40, 260

(56) References Cited

U.S. PATENT DOCUMENTS 5,450,570 A * 9/1995 Richek et al. ................. 710/10
5,721,943 A * 2/1998 Johnson ....................... 713/300
5,964,871 A * 10/1999 Hester et al. .................. 713/1
6,011,909 A * 1/2000 Newlin et al. ................ 790/227
6,052,731 A * 4/2000 Holdsworth et al. ......... 709/229
6,052,744 A * 4/2000 Moriarty et al. .............. 710/27

* cited by examiner

Primary Examiner—Jeffrey Gaffin
Assistant Examiner—Mohammad Farooq
(74) Attorney, Agent, or Firm—Toler, Larson & Abel, LLP

(57) ABSTRACT

A system and methods are provided for resolving resource conflicts related to processing multiple media streams on a single media device. An audio/video (A/V) server is used to interconnect a plurality of media devices. A first multimedia program is routed from a first source device to a first destination device. The A/V server detects a conflict when a second source device attempts to route a second multimedia program to the first destination device. To resolve the conflict, the A/V server determines suitable media devices to process the second multimedia program. The A/V server may send the second program to a second destination device to process the second program in the same manner as the first destination device. Alternatively, the A/V server may send the second program to a destination device capable of recording the second program.

55 Claims, 7 Drawing Sheets

SYSTEM FOR RESOLVING CONFLICTS DUE TO SIMULTANEOUS MEDIA STREAMS AND METHOD THEREOF

FIELD OF THE DISCLOSURE

The present invention relates generally to multimedia systems and more particularly to resolving resource conflicts within multimedia systems.

BACKGROUND

The growth of multimedia technology has altered the concept of the home entertainment system from a simple television to a collection of multimedia devices. The multimedia devices may include video recorders/players, digital video disk (DVD) players, compact disc (CD) players, audio receivers, and digital or analog video tuners. The collection of multimedia devices provides a home user a variety of options for experiencing various video and audio entertainment programs.

Despite the growth in the number of multimedia devices included in home entertainment systems, most of the devices become centralized to a particular room and include only one display device and/or one set of speakers. Multiple entertainment systems may exist in a single home; however, each entertainment system is generally kept in a separate room. A user generally watches a single multimedia program at a time. It is difficult for a user to watch or listen to two separate sets of audio and/or video content. Multiple multimedia programs running consecutively require a user to split his attention among the multiple multimedia programs. Since a user does not generally desire to watch multiple programs displayed at the same time, multiple display devices are not generally used within a single entertainment system. However, as the number of multimedia resources devices connected to the single display and/or speaker system increases, the chance of generating a multimedia resource conflict increases.

Multimedia resource conflicts occur when an attempt is made to send more than one program to the same multimedia resource, such as the display or the speaker system. For example, a DVD player may currently be presenting a video program through the only available display device at the same time a television tuner is scheduled to provide a separate program through the display. A conflict occurs since the display is unable to handle both requests at the same time. Few solutions have been used to resolve the conflict.

Most conventional systems prompt the user with a warning that a resource conflict has occurred. The user is given an option to cancel one of the presented programs, allowing the user to select the program offered by the television tuner over the DVD program. Alternatively, conventional systems for resolving resource conflicts provide the user with an option to receive both video programs at a degraded quality. For example, the video from the DVD program and the video from the television tuner may be scaled to each occupy a separate portion of a screen on the display device. Alternatively, one video program may be given the majority of the screen and the other video program is scaled to a smaller window.

It becomes difficult for a user to divide attention between the two programs simultaneously, and the proper experience of the video program is lost. In the case of audio programs, the speakers are generally used to only handle a single audio program. While multiple audio programs may be mixed and presented through a single speaker system, the result is generally confusing and it becomes difficult for a user to identify and enjoy a single audio program from the mixed output. From the above discussion, it is apparent that an improved system for handling multimedia resource conflicts is needed.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides for a method of resolving multimedia resource conflicts. The method includes receiving a first request to present a first program data to a first media device. In one embodiment, the first request includes video content from a video playback device, such as a DVD player. Accordingly, the first media device may include a display used to view the video content. The method further includes receiving a second request to present a second program data to the first media device. In one embodiment, the second request includes video content from a broadcast source, such as a television program scheduled for viewing on the first media device. The method also includes determining that a conflict exists at the first media device between the first request and the second request. In one embodiment, the method includes resolving the conflict by presenting one set of program data at an alternate media device, allowing the content related to the other set program data to be presented elsewhere. In another embodiment, the method includes resolving the conflict by processing one set of program data at a media recording device, allowing the content to be recorded for presentation at a later time, when a resource conflict with the first media device no longer exists. One advantage of at least one embodiment of the present invention is that multimedia resource conflicts can be resolved without degrading the quality of the multimedia content.

Figure 1:
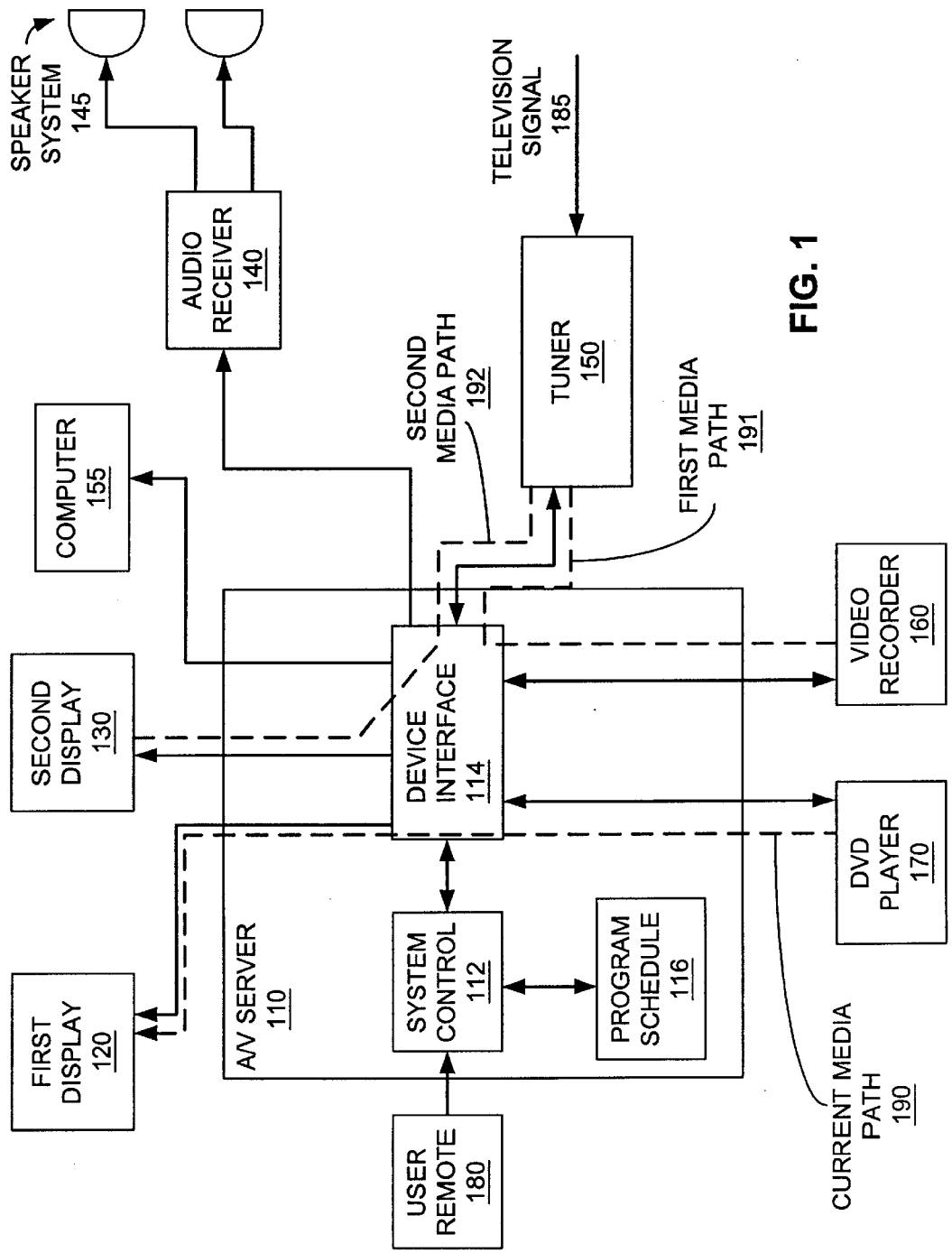
FIG. 1 is a block diagram illustrating a system for routing media data for resolving media resource conflicts, according to one embodiment of the present invention.

Referring now to FIG. 1, a block diagram illustrating a system for routing media data for resolving media resource conflicts is shown, according to one embodiment of the present invention. An audio/video (A/V) server 110 monitors connected media devices 120–170 to determine when a media resource conflict occurs. Media devices include, but are not limited to, non-sharable media devices used to present video or audio program content to a user, such as first display 120, second display 130, and audio receiver 140. In one embodiment, the media devices 120–140 are unable to support more than one media program at a time. A media program is a multimedia event including video and/or audio content. The media program may include multimedia content related to multimedia content recorded on DVD player 170 or video recorder 160, or multimedia content transmitted through television signal 185 and decoded through tuner 150. A conflict is identified when a media program is scheduled for a busy resource. A/V server 110 routes content from one of the conflicting media programs to another media device, which is not busy, to resolve the conflict.

Tuner 150 represents a television tuner used to select a multimedia program from a television signal 185. In one embodiment, tuner 150 is an analog television tuner used to select an analog television channel of television signal 185 and provide video and audio data related to a multimedia program of the selected channel. Alternatively, tuner 150 may represent a digital television tuner used to select and decode video and audio data related to a digital television channel of television signal 185, or one or more additional tuners of any type. Tuner 150 sends the video and audio data related to the selected channel to A/V server 110, through device interface 114. A/V server 110 may route the audio and video data to an appropriate media device of media devices 120–170. For example, audio data may be routed to audio receiver 140, for presentation through an audio speaker system 145, and video data may be routed to first display 120.

Video recorder 160 represents a device capable of recording multimedia content. In one embodiment, video recorder 160 includes an analog video tape recorder, such as a videocassette recorder (VCR), capable of recording video and audio data representative of a portion of a multimedia program. Alternatively, video recorder 160 may include a digital video recorder, capable of recording digital video and analog data representing a portion of a multimedia program. Other media recording devices may also be included. For example, an information handling system, such as computer 155 may be included for recording video or audio data. In one embodiment, A/V server 150 delivers the video and audio data to be recorded by video recorder 160 or computer 155, through device interface 114. In one embodiment, video recorder 160 is further capable of playing back recorded multimedia content. Video recorder 160 sends video and audio data related to the recorded multimedia content to A/V server 110, through device interface 114. Computer 155 may also be used for playing back recorded video and/or audio data.

A digital video disk (DVD) player 170 may be used to provide media data related to a multimedia program recorded on a DVD disk (not shown). DVD player 170 decodes the digital video and audio data recorded on the DVD disk. DVD player 170 provides decoded video and audio data to A/V server 150, through device interface 114.

As previously discussed, first display 120 and second display 130 are used to present a representation of video data to a user. Similarly, audio receiver 140 is used to present a representation of audio data to the user, through audio speaker system 145. In one embodiment, system control 112 is used to route media data to appropriate devices. For example, system control 112 may be used to route video data from DVD player 170 to first display 120, as shown in current media path 190.

In one embodiment, a user sets the sources and destinations for media data among media devices 120–170, through A/V server 110. The user may make the desired settings through a user control 180, interfaced through system control 112. In one embodiment, user control 180 is an infrared remote which provides an infrared signal to be decoded by A/V server 110. User control 180 may also be a radio frequency (RF) remote which uses RF signals to communicate with A/V server 110. Alternatively, user control 180 may include a physical line or connection to A/V server 110. The user may select a current program to watch through one of the media devices, such as first display 120. For example, the user may select a particular multimedia channel to be selected through tuner 150 and be displayed on first display 120.

Figure 2:
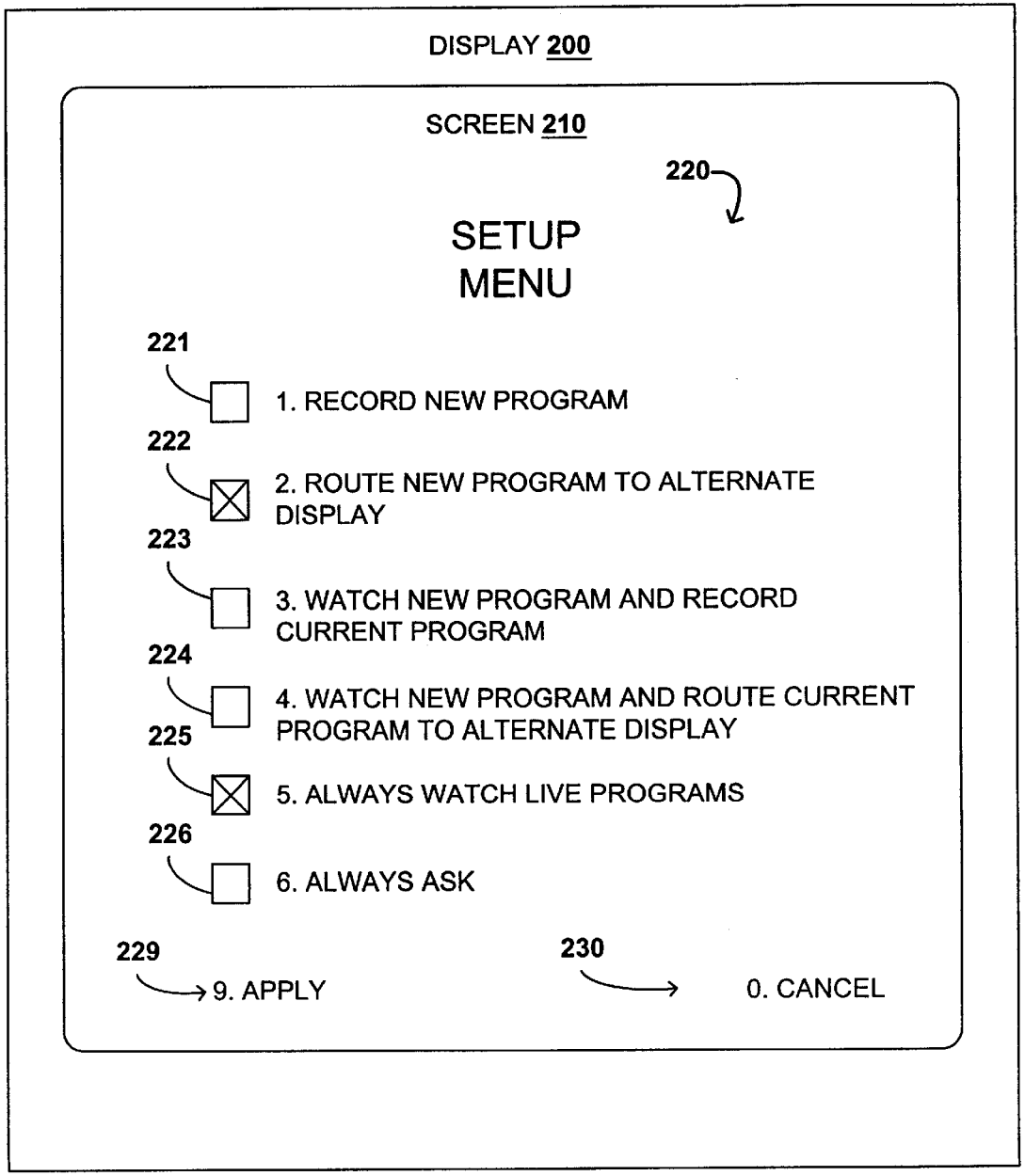
FIG. 2 is a setup menu display for configuring options associated with the system from FIG. 1, according to one embodiment of the present invention.

The user may program select multimedia programs or channels to be selected at particular times. A list of scheduled programs may be obtained via an electronic program guide or other suitable means, and then stored in A/V server 110, through program schedule 116. In one embodiment, the user selects future programs to watch using user control 180. A list of scheduled events is stored in program schedule 116. The scheduled events include a list indicating the media programs to be presented, including a source media device, and the times the media programs are to be presented, including a destination media device. Program schedule 116 is monitored by system control 112 to determine when to provide control of a scheduled media source, such as tuner 150, to deliver video and audio data representative of the scheduled program to a destination media device, such as first display 120. As previously discussed, if a scheduled program is sent to a busy media device, a resource conflict occurs. The user may also select default options to use in resolving media resource conflicts, as shown in FIG. 2.

In one embodiment, the user provides a command through user control 180 to present video data generated from DVD player 170 on first display 120. Accordingly, A/V server 110 routes video data from DVD player 170 to first display 120, through device interface 114, as shown in current media path 190. However, a program in program schedule 116 is scheduled for presentation through first display 120. System control 112 identifies the program to be presented and, in response to the identified program, sets tuner 150 to decode the video and audio data related to the appropriate channel of the scheduled program. Video data related to the scheduled program is sent to A/V server 110, through device interface 110. A/V server 110 monitors the destination device, such as first display 120 in this example, to determine if it is busy processing other media data.

In the illustrated example, first display 120 is busy displaying video data related to DVD player 170, as shown through current media path 190. A/V server 110 determines which options are available for handling the resource conflict. In one embodiment, as shown through first media path 191, the multimedia data from tuner 150 may be redirected to video recorder 160, through device interface 114. Video recorder 160 may then be used to record multimedia data representative of the scheduled program. The user may then play back the recorded media data at leisure. It should be noted that A/V server 110 might need to determine if video recorder 160 is currently available. For example, video recorder 160 may be busy recording other media data or may be playing back recorded media data. If video recorder 160 is busy, an alternate solution may be selected.

In one embodiment, the user may prefer to watch the program on another display, such as second display 130, allowing the current presentation on first display 120 to be undisturbed. As shown in second media path 192, A/V server 110, redirects the video data from tuner 150 to second display 130. While solutions are shown for redirecting the scheduled program, A/V server 110 may be configured to play the scheduled program on first display 120 and redirect the current program being presented on first display 120. It should be noted that while solutions for routing video data have been described, audio data would generally also be redirected for recording on video recorder 160 or presentation on an alternate audio receiver (not shown).

A/V server 110 may select among available solutions according to user preferences or default settings. Priority may be assigned to the different solutions, allowing a preferred solution to always be implemented, if available. In one embodiment, the user may select user preferences through a system menu, accessed through user control 180, as shown in FIG. 2. A/V server 110 may also provide an indication to the user on current solutions being implemented. The indication may be provided through text displayed on a media device, such as first display 120. A/V server 110 may also request further input from the user to select from a list of available solutions to determine a course of action for resolving conflict. In one embodiment, when only one solution is available, A/V server implements the solution without requiring acknowledgment from the user. In one embodiment, first display 120 and second display 130 are part of separate media centers with their own collection of media devices, as described further in reference to FIG. 7.

Referring now to FIG. 2, a setup menu display for configuring options associated with the system from FIG. 1 is shown, according to one embodiment of the present invention. When more than one media device of a collection of media devices attempts to send video to the same display, a resource conflict occurs. In one embodiment, an A/V server is used to redirect multimedia data being sent to a busy device to another media device capable of handling the multimedia data. A setup menu 220 is used to provide a user with various options 221–226 for resolving resource conflicts. After the user has selected among the various options 221–226, the A/V server may implement the options to resolve conflicts without requiring user intervention, when the options are available.

Setup menu 220 is presented on a screen 210 of a display device 200. Display device 200 is a media device capable of presenting video data, such as first display 120. In one embodiment, setup menu 220 is presented once the user selects a menu option from the A/V server, through a user control or switch available on the A/V server. In another embodiment, the user is prompted with setup menu 220 in response to a detected resource conflict. Setup menu 220 provides the user with a number of options 221–226 for handling resource conflicts. Selected options of options 221–226 are stored to resolve future conflicts. In one embodiment, the A/V server monitors a set of connected media devices to generate the list of options 221–226. For example, A/V server may detect a connected media, or video recorder, allowing it to present options for recording video data, such as options 221 and 223. Alternatively, setup menu 220 may present all solutions that may be performed by the A/V server, determining which are available when a resource conflict actually occurs. The user selects options among user options 221–226 to define preferred settings. Options 221–226 may also be set to default values, allowing the A/V server to work from a set of predefined values regardless of whether a user has accessed setup menu 220.

As previously discussed, a resource conflict occurs when a media device attempts to send multimedia data to another media device, which is already busy. The other media device may be busy presenting media data from yet another media device. For example, a television tuner may attempt to send video related to a predefined scheduled program to a display, such as display 200; however, the display is currently busy presenting video data from a DVD player. Options 221–226 provide various mode of operation, or solutions, for handling the resource conflict.

Options 221 and 222 are used for redirecting video data related to a new media device that is attempting to send video associated with a new program to a busy primary display. Option 221 indicates the user would prefer to have the media data from the new media device recorded. The multimedia data is routed to a media recording device, such as a video recorder. The multimedia data is recorded to allow the user to continue experiencing a current program on the primary display, such as display 200. The user may then watch the recorded program on the primary display at a later time, using the video recorder. Option 222, indicates the user would prefer to have the media data from the new program, redirected to an alternate display. In one embodiment, the display forms a part of an alternate media center, separate from the primary display, as described in FIG. 7. The alternate display may be in a different room from the primary display. Redirecting the new program allows the current program to be undisturbed on the primary display while allowing the new program to be displayed on the alternate display. In one embodiment, a first user wishes to continue watching the current program on the primary display. The new program is redirected to the alternate display to allow a second user to watch the new program in another room. In one embodiment, the new program to be displayed is assigned through a program schedule programmed by the user.

Alternatively, somebody attempting to play a new video or selecting a new program using a television tuner, while the primary display is busy, may assign the new program.

Alternatively, options 223 and 224 are used to define user preferences to redirect the current program while allowing the new program to be displayed on the primary display. Option 223 indicates the user's preference to redirect the current program being displayed on the primary display to a video recorder. The new program may then be displayed on the primary display, while the current program is recorded, allowing the user to watch the current program at a later time. Option 224 indicates a user preference to redirect the current program being displayed on the primary display to an alternate display. The new program may then be displayed on the primary display as scheduled.

In one embodiment, the new or current programs may represent live events being selected through the television tuner. Option 225 allows the user to select an option to always watch live events on the primary display. Accordingly, if the current program being watched is a live event, the new program is redirected to an alternate display or recorded. Alternatively, if the new program is a live event, the current program is redirected. In the case of both the current and new programs representing live events, the A/V server may refer back to user preferences defined by options 221–224.

Option 226 allows the user to select an option to always be asked which course of action the A/V server should take. Accordingly, if more than one course of action is detected by the A/V server when a resource conflict is detected, a menu similar to setup menu 220 may be provided for the user to select the course of action to take. In one embodiment, if only one course of action is available by the A/V server, the A/V server may automatically implement the available solution. In another embodiment, when the A/V server is about to implement an action, defined by the user preferences, the A/V server provides an indicator to the user indicating it is about to implement the action and allowing the user to intervene. For example, text may be displayed on the primary display to indicate the A/V server will being recording a new program on the video recorder, unless the user cancels the action within a particular amount of time, such as 15 seconds.

Option 229 may be used to allow the user to confirm the preferences selected. Alternatively, the user may select option 230 to cancel the current selected preferences, allowing the A/V server to defer back to a set of factory-installed options. In another embodiment, setup menu 220 allows a user to assign a priority to the various options 221–226, allowing the user to define an order in which the A/V server should try to resolve the resource conflict. For example, if an option with a highest assigned priority is unavailable, the option with the next highest priority, which is available, will be implemented. Despite the preferences defined by the user through setup menu 220, the desired options may not be available at the time in which the resource conflict occurs. For example, the video recorder may be disconnected at a later time, canceling options 221 and 223. The A/V server searches through the available media devices to determine which devices are available, as shown in FIG. 3.

Figure 3:
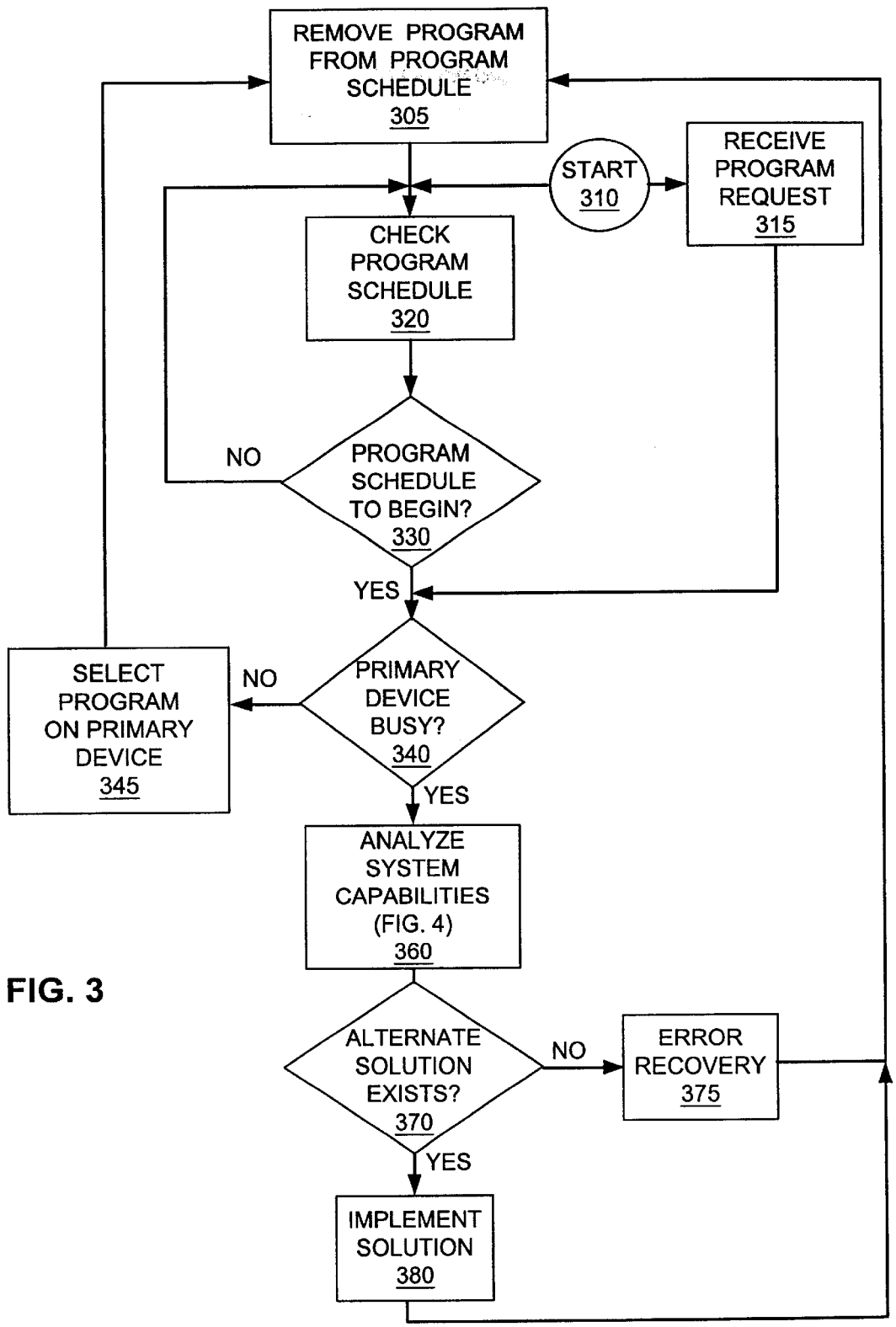
FIG. 3 is a flow diagram illustrating steps for identifying and resolving resource conflicts, according to one embodiment of the present invention.

Referring now to FIG. 3, a flow diagram illustrating steps for identifying and resolving resource conflicts is shown, according to one embodiment of the present invention. In one embodiment, a primary display device, such as first display 120 (FIG. 1), is used for presenting video data related to multimedia programs requested by a user or scheduled in a stored program schedule. If the first display is already being used to present video from another multimedia program when the new program is requested, a resource conflict occurs. In one embodiment, the primary display is only capable of handling video data related to a single program at one time. An A/V server with a plurality of connected media devices, analyzes the sets of connected media devices to determine solutions for resolving the resource conflict. In one embodiment, the available solutions are presented to the user to determine which solution, if any, to implement. In another embodiment, the available solutions are compared to a set of predefined or default preferences.

In step 310, the process is started, either by an external request, such as a user request, or when content related to a program is received, as in step 315, or by the A/V server's periodic program check, as in step 320. In step 320, the A/V server monitors a program schedule. The program schedule includes a list of programs scheduled for display on the primary display. In one embodiment, the program schedule provides a time at which to present a particular program and a channel to set a television tuner at to receive multimedia data related to the program. In step 330, the A/V server determines if any of the listed programs are scheduled to begin. If no programs are scheduled to begin, the A/V server continues to monitor the program schedule, as in step 320. In step 330, if a program is scheduled to begin, the A/V server determines if the primary device scheduled to present the program, such as the primary display, is busy, as in step 340.

In one embodiment, a user may select a program to be viewed immediately, as in step 315. For example, a user may place a DVD in a DVD player and select video from the DVD player to be immediately displayed on the primary display. A receipt of media content from any connected media device may also trigger the A/V server. For example, a VCR operating on an internal timer may begin providing multimedia content, related to a particular program, to the A/V server. Once the user makes the request, the A/V server transitions to step 340 to determine if the primary display is busy.

In step 340, the A/V server determines if the destination device to present the program is busy. In one embodiment, the primary device is the primary display device. The primary display device may be busy presenting video data related to another media device, such as the DVD player, and is unable to present the new data. If the primary device is not busy, media data related to the program is assigned to the primary device, as in step 345. Once the program is being presented on the primary device, the A/V server removes the program from the program guide, as in step 320. If the primary device is busy in step 340, a resource conflict has occurred. The A/V server then begins the process of identifying possible solutions and transitions to step 360.

In step 360, the A/V server analyses the capabilities of a collection of media devices connected to A/V server. In one embodiment, several media devices, including displays, video recorders, and audio receivers, are interfaced with the A/V server. In one embodiment, sets of media devices are grouped as separate media centers. For example, the primary display may be grouped with a video recorder and a first set of audio equipment to establish a first media center. A secondary display may be grouped with a DVD player and a second set of audio equipment to establish a second media center. In step 360, the A/V server monitors the connected devices in each of the media centers to identify resource conflict solutions, as described further in reference to FIG. 4.

In step 370, the A/V server determines if any resource conflict solutions were found during the analysis performed through step 360. If no solutions were found, the A/V server performs error recovery in step 375. In one embodiment, error recovery includes prompting the user that no conflict resolution was found. The user may be provided with an option to either replace the current program with the new program or to cancel the new program. Once the error recovery is complete, the A/V server transitions to step 320 where the current program is cancelled and the A/V server continues to monitor the program schedule, as in step 320. In step 370, if an alternate solution was found, the A/V server transitions to step 380, where the solution is implemented.

In step 380, an identified solution is implemented. In one embodiment, if more than one solution exists, the solutions are compared to a preference set by the user or a set of default preferences. If no preferred solution exists, the user may be prompted to choose which solution to implement. In one embodiment, the user is always prompted with the available solutions. In another embodiment, if only one solution exists, it is always implemented automatically. A step 305 is provided to discard the scheduled program from the program schedule. Whether or not a solution was found, the program event is removed from the program schedule. In the case of an external request to present video, as in step 315, the received request may be processed in place of a current program. Alternatively, the received request may be cancelled, to allow the current program to be uninterrupted.

Figure 4:
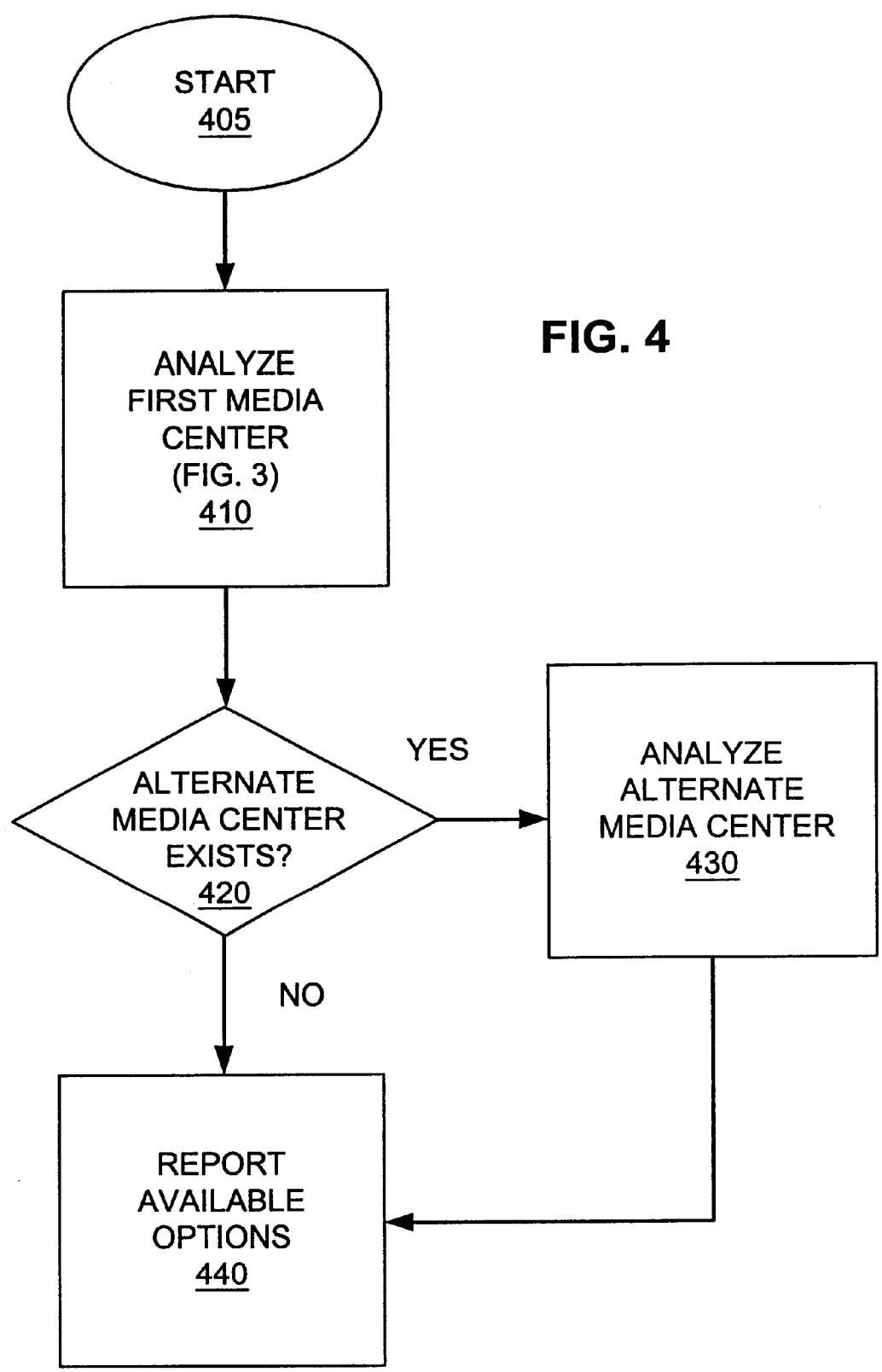
FIG. 4 is a flow diagram illustrating steps for identifying resource conflict solutions among multiple media centers, according to one embodiment of the present invention.

Referring now to FIG. 4, a flow diagram illustrating steps for identifying resource conflict solutions among multiple media centers is shown, according to one embodiment of the present invention. As previously discussed in reference to FIG. 3, an A/V server may include collections of media devices connected as groups of media servers. For example, one collection of media devices may include a media center in a first room. A second collection of media devices may represent a second media center in a second room, separate from the first room. The A/V server monitors the devices in each of the media centers to determine if any solutions to resolve resource conflicts can be found.

In step 405, the process of determining resource conflict solutions is started. In one embodiment, the identification of a resource conflict initiated the process. In another embodiment, the process is initiated when a user attempts to setup the A/V server to handle future conflicts. In yet another embodiment, the A/V server may initiate the process periodically to identify possible solutions for future resource conflicts. In step 410, the devices within a first media center are analyzed, as described in further detail in reference to FIG. 5. The media devices of the media center are analyzed to determine if any are capable of supporting a new program creating the resource conflict.

In step 420 it is determined if any alternate media centers are present. The A/V server may simply probe interfaced devices to determine the presence of alternate media centers and/or devices. If an alternate media center is present in step 420, the alternate media center is analyzed to determine if any solutions exist among the devices of the alternate media center, as in step 430. In one embodiment, the A/V server continues to return to step 420 to identify other media centers not analyzed, until no further alternate media centers are found. If no additional media centers are found in step 420, the A/V server simply reports the solutions, if any, which were found, as in step 440. The A/V server may then analyze the reported solutions, as in step 370 (FIG. 3).

Figure 5:
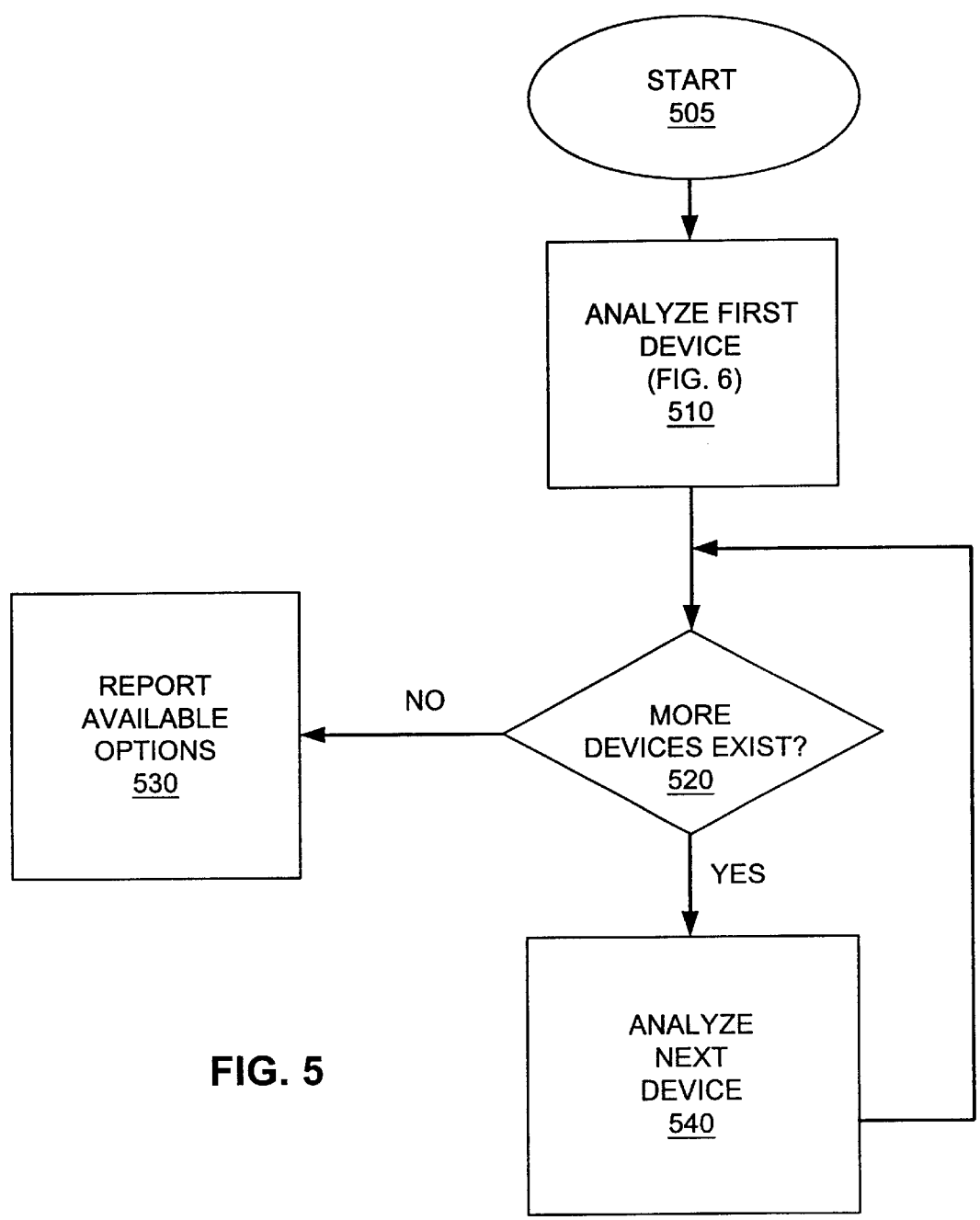
FIG. 5 is a flow diagram illustrating steps for identifying resource conflict solutions among multiple media devices of a particular media center, according to one embodiment of the present invention.

Referring now to FIG. 5, a flow diagram illustrating steps for identifying resource conflict solutions among multiple media devices of a particular media center is shown, according to one embodiment of the present invention. An A/V server detects a resource conflict when more than one program are directed toward a single media device. To resolve the resource conflict, the A/V server analyzes a collection of connected media devices to determine if any are capable of handling one of the conflict related programs.

In step 505, the process of determining if any solutions are available is started. In one embodiment, the process is initiated through the detection of a resource conflict. In another embodiment, the process is initiated when a particular media center is analyzed to determine if any solutions exist, as in step 410 (FIG. 4). In step 510, a first media device within a media center is analyzed, as described in further detail with reference to FIG. 6. In one embodiment, if the first media device is related to the resource conflict, the device is skipped since it is already determined the device is busy. For example, if the resource conflict is related to more than one programs being presented to the same display device, it is unnecessary to analyze the same display device if it has already been determined it is busy. Furthermore, if one of the source devices related to the resource conflict is a video recorder, it is unnecessary to analyze the video recorder as it will be busy providing video data, once a solution has been found.

In step 520, it is determined if more media devices are available. If no further media devices are found, the process terminates with step 530 where the solutions, which have been found, are reported. In step 520, if another media device is found, the media device is analyzed, as in step 540. Accordingly, the media device is analyzed to determine possible resource conflict solutions associated with it. Once the media device is analyzed, the A/V server returns to step 520 to determine if any further media devices are available.

Figure 6:
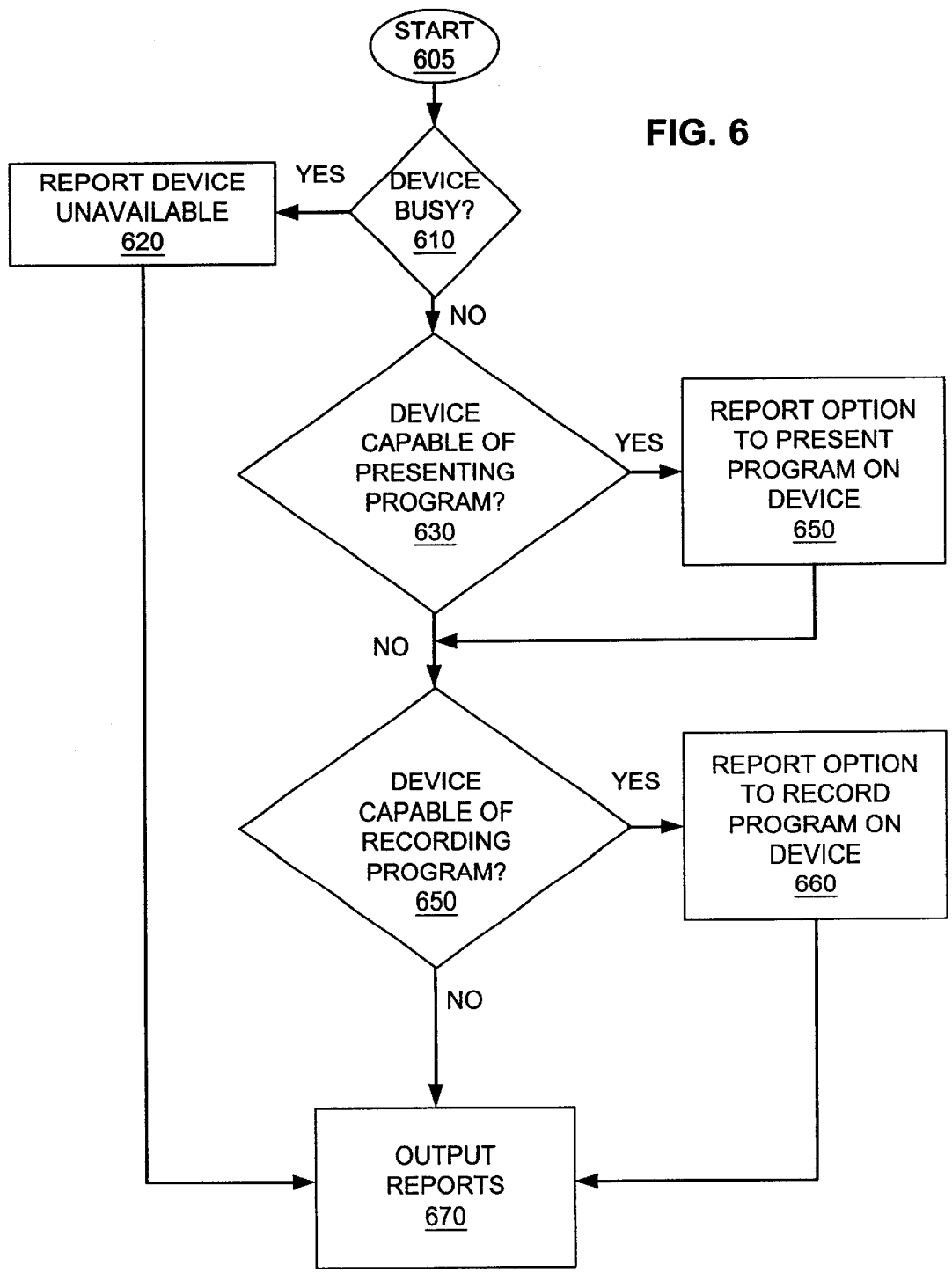
FIG. 6 is a flow diagram illustrating steps for identifying resource conflict solutions available from a particular media device, according to one embodiment of the present invention.

Referring now to FIG. 6, a flow diagram illustrating steps for identifying resource conflict solutions available from a particular media device is shown, according to one embodiment of the present invention. When a resource conflict has occurred, an A/V server analyses individual media devices connected to it. The A/V server determines if a possible solution exists among the media devices. If a solution is found in relation to a particular media device, a program related to the resource conflict may be redirected to the available media device to resolve the resource conflict.

In step 605, the process of analyzing a particular media device starts. In one embodiment, the process is initiated by the A/V server analyzing media devices associated with a particular media center, as in step 510 (FIG. 5). In step 610, it is determined if the media device is busy. The media device may already be used to process a separate media request. For example, the media device may be a video recorder that is busy playing a recorded multimedia program. The media device may also be a display device. The display device may be busy presenting another video program. In one embodiment, the media device may be considered busy if it is scheduled for use soon, according to a program schedule. If the media device is busy, a report is generated indicating the particular media device is unavailable. The report is then output in step 670, allowing the A/V server to try and find another solution.

In step 610, if the device is not busy, the A/V server determines if the device is capable of presenting the program, as in step 630. In one embodiment, the media device is a video display. If the resource conflict is related to video data, the display will be capable of displaying the program. If the conflict is related to audio data, the display device may be unable to present the program. If the media device is capable of presenting the program, a report is generated indicating the available option to present the program on the media device. The A/V server then transitions to step 650 to determine if the device is further capable of recording the program.

In step 630, if the device is incapable of presenting the program, the A/V server transitions to step 650. In step 650, it is determined if the media device is capable of recording the program. If the media device is capable of recording the conflict-associated program, a report is generated indicating the ability of the media device to record the program, as in step 660. Once the report of step 660 is generated, or if the device was not found capable of recording the program, the A/V server completes the analysis of the current media device in step 670. In step 670, all the available options, or lack of options, related to handling the program with the particular media device are reported. In one embodiment, the A/V server further analyzes the reported results to determine a course of action. It should be appreciated that other analysis of the capabilities of the media device may be performed to determine further options, without departing from the scope of the present invention.

Figure 7:
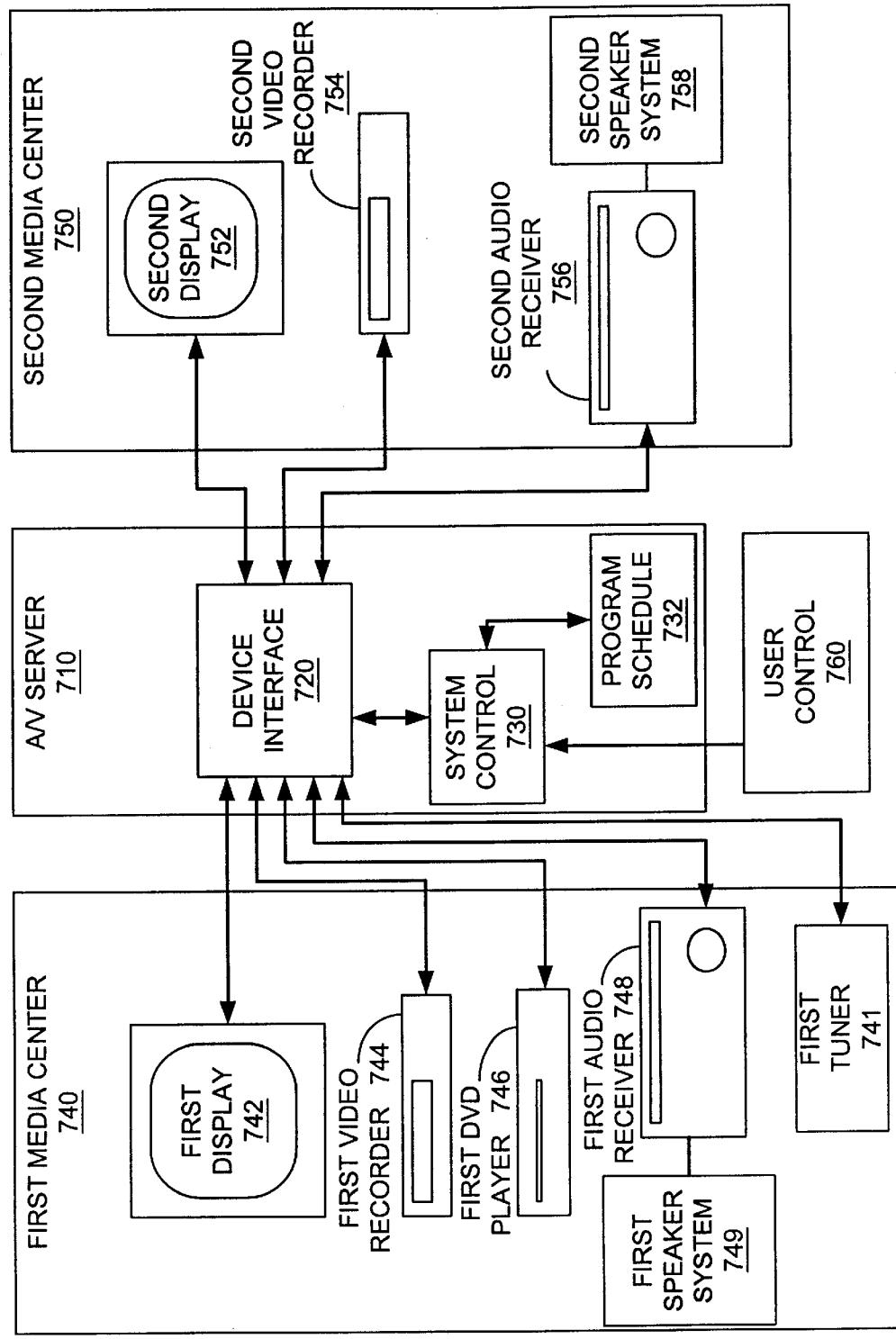
FIG. 7 is a block diagram illustrating a system for routing video to resolve resource conflicts among multiple media centers, according to one embodiment of the present invention.

Referring now to FIG. 7, a block diagram illustrating a system for routing video to resolve resource conflicts among multiple media centers is shown, according to one embodiment of the present invention. An A/V server 710 is used to monitor a collection of various media devices 741–748 and 752–758. A/V server 710 identifies if more than one device is attempting to make use of a particular media device. For example, if first DVD player 746 is presenting video through first display 742 and video from first tuner 741 is scheduled for presentation on first display 742, a resource conflict has occurred. A/V server 710 analyzes the media devices 741–748 and 752–758 connected through device interface 720 to determine if an error has occurred. In the illustrated embodiment, the media devices 741–748 and 752–758 are grouped into separate media centers, first media center 740 and second media center 750, respectively.

In one embodiment, A/V server 710 includes a device interface 720 for interconnecting a plurality of media devices 741–748 and 752–758 from media centers 740 and 750, respectively. A/V server 710 includes a system control 730 for monitoring media devices 741–748 and 752–758 connected through device interface 720 and for routing multimedia data among the plurality of media devices 741–748 and 752–758. Through user control 760, a user may schedule multimedia programs to be presented using media devices 741–748 and 756. For example, a user may set a program schedule 732 to select a specific television channel on first tuner 741 and provide decoded video data related to the selected program on first display 742. Similarly, audio data may be presented through first audio receiver 748 and first speaker system 749. Scheduled programs may be tracked through program schedule 732. In one embodiment, program schedule 732 includes a list of programs to be presented, a source device to retrieve multimedia data from, a destination device to provide the multimedia data to, and a time to present the multimedia data. User control may include a remote control or a set of switches or buttons coupled to system control 730 of A/V server 710.

In one embodiment, first media center 740 represents an entertainment center in a first room. First media center 740 includes first display 742 for displaying video data and first audio receiver 748 for providing audio output through first speaker system 749. First video recorder 744 may be used to record multimedia content or play back multimedia content. In one embodiment, first video recorder 744 includes a VCR. First DVD player 746 may be used to decode multimedia data related to DVD disks. First tuner 741 may be used to tune selected channels of a television signal to receive multimedia data related to television programs.

In one embodiment, second media center 750 represents a second entertainment center in a second room, different from first media center 740. Second media center 750 may include second display 752 for displaying video data and second audio receiver 756 for providing audio output through second speaker system 758. A second video recorder 754 may be used for recording or playing back multimedia content.

As previously discussed, A/V server 710 may be used to resolve resource conflicts. In one embodiment, first display 742 is busy displaying video data related to first DVD player 746. A resource conflict may occur when first tuner 741 is set to provide video data to first display 742, according to program schedule 732. A/V server 710 analyses the media devices from centers 740 and 750 to determine possible resolutions to the resource conflict. For example, the multimedia data from first tuner 741 may be redirected and recorded on first video recorder. Alternatively, the multimedia data from first tuner 741 may be redirected to second media center where it may be recorded using second video recorder 754 or displayed using second display 752, with audio output using second audio receiver 756. Alternatively, the multimedia data from first tuner 741 may be presented through first display 742, with the multimedia content from first DVD player being redirected to second display 752. In one embodiment, the user is provided the option of selecting among available conflict resolutions. In another embodiment, the conflict resolutions are compared against a set of default preferences, set by the user or factory-installed, to determine the best resolution or mode to implement.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been describes in reference to video and audio processing components, the present invention may be practiced using other types of system components. It should be appreciated that the system described herein has the advantage of providing resource conflict resolution without deterring multimedia quality presented to a user.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:

receiving a first request to present a first multimedia program data to a first media device;

receiving a second request to present a second multimedia program data to the first media device;

determining that a conflict exists at the first media device between the first request and the second request; and resolving the conflict by processing the second multimedia program data at a media recording device, wherein the media recording device is used to record a representation of the second multimedia program data.

2. The method as in claim 1, wherein the second multimedia program data is video data.

3. The method as in claim 2, wherein the first media device is a display device.

4. The method as in claim 1, wherein the second multimedia program data is audio data.

5. The method as in claim 4, wherein the first media device is an audio receiver.

6. The method as in claim 1, wherein the first media device is part of a first plurality of media devices in a first media center.

7. The method as in claim 6, further including monitoring media devices in the first media center and media devices in a second media center, including a second plurality of media devices, to determine the media recording device.

8. The method as in claim 7, wherein the media recording device is in the second media center.

9. The method as in claim 1, wherein the second multimedia program data is generated by an information handling system.

10. The method as in claim 1, wherein the media recording device includes an information handling system.

11. The method as in claim 1, wherein resolving the conflict is based on user preferences.

12. The method as in claim 11, wherein the user preferences are predefined.

13. The method as in claim 11, further including prompting a user for the user preferences after determining that the conflict exists.

14. The method as in claim 13, wherein the user preferences are stored to resolve future conflicts.

15. A method comprising:
  identifying a first event that is to affect a first media device in a first manner;
  identifying a resource conflict at the first media device between the first event and a second event;
  identifying at least one alternate media device capable of being affected by the second event in a second manner;
  when in a first mode of operation, recording a representation of the second event using a first media recorder in response to identifying the resource conflict; and
  when in a second mode of operation, providing a representation of the second event to a second media device for presentation in response to identifying the resource conflict.

16. The method as in claim 15, wherein the first event includes presenting a representation of a first multimedia program.

17. The method as in claim 16, wherein the second event includes presenting a representation of a second multimedia program, different from the first multimedia program.

18. The method as in claim 16, wherein the multimedia program includes video data.

19. The method as in claim 18, wherein the first manner includes displaying the video data in the first media device.

20. The method as in claim 19, wherein the first and second media devices are display devices.

21. The method as in claim 16, wherein the multimedia program includes audio data.

22. The method as in claim 21, wherein the first and second media devices are audio receivers.

23. The method as in claim 15, wherein the second manner is the same as the first manner.

24. The method as in claim 15, wherein the second manner is different from the first manner.

25. The method as in claim 15, wherein the first media recorder includes a video recorder.

26. The method as in claim 15, wherein the mode of operation is dependent on identifying additional media devices.

27. The method as in claim 15, wherein the mode of operation is dependent on user preferences.

28. The method as in claim 27, wherein the user preferences are predefined.

29. The method as in claim 28, further including prompting a user for the user preferences in response to identifying the first conflict.

30. The method as in claim 29, wherein the user preferences are stored for resolving future conflicts.

31. The method as in claim 15, wherein the mode of operation is dependent on defaults.

32. The method as in claim 15, wherein the first media device is of a first plurality of media devices in a first media center.

33. The method as in claim 32, wherein identifying at least one alternate media device includes monitoring media devices of the first media center and a second media center, including a second plurality of media devices.

34. A system comprising:
  a device interface to connect to a plurality of media devices, wherein said plurality of media devices include:
    a first media device to process requests to provide program data in a first manner;
    a second media device to process requests to provide program data in a second manner;
  a system controller to:
    receive a first request to provide a first multimedia program data to the first media device;
    receive a second request to provide a second multimedia program data to the first media device;
    identify available media devices connected to said device interface; and
    determine a mode of operation to handle said resource conflict, wherein:
      a first mode of operation includes processing the second request in the second media device, wherein the second manner is similar to the first manner; and
      a second mode of operation includes recording a representation of the second program data related to the second request in the second media device.

35. The system as in claim 34, further including a program schedule.

36. The system as in claim 35, wherein the second request is determined from the program schedule.

37. The system as in claim 34, wherein the user generated the second request.

38. The system as in claim 34, wherein the mode of operation is dependent on the capabilities of the second multimedia device.

39. The system as in claim 38, wherein the first mode of operation is selected when the second media device is capable of processing the second request according to the first manner.

40. The system as in claim 38, the second mode of operation is selected when the second multimedia media-device capable of recording the second request.

41. The system as in claim 34, wherein the multimedia program data includes video data.

42. The system as in claim 34, the multimedia program data includes audio data.

43. The system as in claim 34, wherein the first media device is of a first plurality of media devices in a first media center.

44. The system as in claim 43, wherein said device controller is further used to monitor media devices of the first media center and a second media center, including a second plurality of media devices to identify said available media devices.

45. A method comprising:
- receiving at a multimedia control center a first multimedia signal for presentation to a first multimedia device;
- sending the first multimedia signal to the first multimedia device;
- receiving at a multimedia control center a second multimedia signal for presentation to the first multimedia device;
- determining at a multimedia control center that the first multimedia device is unavailable, wherein the first multimedia device is unavailable due to the presentation of the first multimedia signal;
- identifying at a multimedia control center a second multimedia device capable of receiving the second multimedia signal; and
- sending the second-multimedia signal to the second multimedia device; in response to determining the first multimedia device is unavailable.

46. The method as in claim 45, wherein the multimedia signal is video data.

47. The method as in claim 46, wherein the first and the second multimedia devices are display devices.

48. The method as in claim 45, wherein the multimedia signal is audio data.

49. The method as in claim 48, wherein the first and the second multimedia devices are audio receivers.

50. The method as in claim 45, wherein the first multimedia device is one a first plurality of multimedia devices in a first media center.

51. The method as in claim 50, further including monitoring the first plurality of multimedia devices in the first media center and a multimedia device in a second media center to determine the alternate media device.

52. The method as in claim 45, wherein identifying the multimedia device is based on user preferences.

53. The method as in claim 52, wherein the user preferences are predefined.

54. The method as in claim 52, wherein an identifying a second multimedia center includes identifying a multimedia recorder to recording the second multimedia signal.

55. The method as in claim 54, wherein the user preferences are stored to resolve future conflicts.

* * * * *